US010426182B2

(12) United States Patent
Franzolin et al.

(10) Patent No.: US 10,426,182 B2
(45) Date of Patent: Oct. 1, 2019

(54) METHOD FOR PRESERVING FOOD

(71) Applicant: NECST S.R.L., Padua (IT)

(72) Inventors: Enrico Franzolin, Cadoneghe (IT);
Luciano Bellemo, Noventa Padovana (IT); Davide Cassi, Fidenza (IT);
Nicola Michelon, Padua (IT)

(73) Assignee: NECST S.R.L., Padua (IT)

(*) Notice: Subject to any disclaimer, the term of this patent is extended or adjusted under 35 U.S.C. 154(b) by 0 days.

(21) Appl. No.: 14/910,097

(22) PCT Filed: Jul. 28, 2014

(86) PCT No.: PCT/EP2014/066176
§ 371 (c)(1),
(2) Date: Feb. 4, 2016

(87) PCT Pub. No.: WO2015/018682
PCT Pub. Date: Feb. 12, 2015

(65) Prior Publication Data
US 2016/0192694 A1 Jul. 7, 2016

(30) Foreign Application Priority Data

Aug. 7, 2013 (IT) .............................. PD2013A0228

(51) Int. Cl.
*A23L 3/34* (2006.01)
*A23L 3/3418* (2006.01)
*A23L 3/3445* (2006.01)

(52) U.S. Cl.
CPC .......... *A23L 3/3418* (2013.01); *A23L 3/3445* (2013.01); *A23V 2002/00* (2013.01)

(58) Field of Classification Search
CPC . A23L 3/10; A23L 3/00; A23L 34/002; A23L 34/005; A23L 3/3418; A23L 3/3445; B65D 1/10; A23B 7/00; A23B 7/144; A23B 7/148; A23B 7/152; A23B 4/00; A23B 4/002; A23B 4/005; B65B 31/00; B65B 55/00; A47J 36/24
USPC ........ 426/106, 113, 324, 325, 410, 411, 412
See application file for complete search history.

(56) References Cited

U.S. PATENT DOCUMENTS

| | | | | |
|---|---|---|---|---|
| 2,214,419 A * | 9/1940 | Jones | ..................... | A23B 7/157 426/325 |
| 3,958,028 A | 5/1976 | Burg | | |
| 5,494,690 A * | 2/1996 | Shelton | ..................... | A21B 1/40 426/233 |
| 5,562,938 A * | 10/1996 | Lee | ..................... | A21C 15/002 426/106 |
| 5,724,886 A * | 3/1998 | Ewald | ..................... | A47F 10/06 99/374 |
| 2004/0151812 A1 | 8/2004 | Bell | | |
| 2007/0212789 A1* | 9/2007 | Havens | .................. | G01M 3/226 436/138 |
| 2011/0070327 A1* | 3/2011 | Wolf | ...................... | A23K 10/38 426/2 |

FOREIGN PATENT DOCUMENTS

| | | |
|---|---|---|
| CN | 1080496 A | 1/1994 |
| CN | 1810583 A | 8/2006 |
| CN | 101019682 A | 8/2007 |
| CN | 102042738 A | 5/2011 |
| GB | 822904 A | 11/1959 |
| GB | 1005612 A | 9/1965 |
| GB | 1010867 A | 11/1965 |
| GB | 1474602 A | 5/1977 |
| JP | H09-322745 A | 12/1997 |
| JP | H10-045177 A | 2/1998 |
| JP | 2000-142815 A | 5/2000 |
| JP | 2003-235473 A | 8/2003 |
| JP | 2004-201640 A | 7/2004 |
| RU | 1809962 A3 | 3/1995 |
| RU | 2301002 C1 | 6/2007 |
| WO | 0100074 A1 | 1/2001 |
| WO | 03094637 A1 | 11/2003 |

OTHER PUBLICATIONS

Spencer, Kevin. "Modified atmosphere packaging of ready-to-eat foods." 2005. Innovations in Food Packaging. pp. 185-201.*
"Drying Jerky." Nov. 17, 2012. Penn State Extension. <http://extension.psu.edu/food/preservation/news/2012/drying-jerky/>. Accessed Mar. 2, 2017.*
"Cook." Mar. 26, 2013. FoodSafety.gov. <http:www.foodsafety.gov/keep/basics/cook/>. Accessed Mar. 2, 2017.*
"Drying Jerky." Nov. 7, 2011. National Center for Home Food Preservation. <http://nchfp.uga.edu/how/dry/jerky.html>. Accessed Mar. 2, 2017.*
"Minnesota Food Code Fact Sheet." Feb. 26, 2004. Minnesota Department of Health, Environmental Health Division.*
Boyer, Renee. "Using Dehydration to Preserve Fruits, Vegetables, and Meats." 2008. Virginia Cooperative Extension. (Year: 2008).*
"Can you cook something for too long in a crockpot?" Tiger Droppings forum. <http://www.tigerdroppings.com/rant/food-and-drink/can-you-cook-something-for-too-long-in-a-crockpot/2465-3244/>. Feb. 21, 2011. p. 2. Accessed Dec. 5, 2017. (Year: 2011).*
Cooperhouse, H. Louis. "Opportunities in Modified Atmosphere Packaging." Food Safety Magazine. Nov. 2003. <https:www.foodsafetymagazine.com/magazine-archive1/octobernovember-2003/opportunities-in-modified-atmosphere-packaging/>. Accessed Dec. 5, 2017. (Year: 2003).*

(Continued)

*Primary Examiner* — Erik Kashnikow
*Assistant Examiner* — Ericson M Lachica
(74) *Attorney, Agent, or Firm* — Volpe and Koenig, P.C.

(57) ABSTRACT

What is described is a method for preserving cooked or pre-cooked food, wherein the cooked or pre-cooked food is kept in a preserving chamber with a controlled atmosphere, substantially at atmospheric pressure and at a predetermined temperature in the range from 57.2° C. to 90° C., for a preservation time of more than at least 24 hours, and wherein the partial oxygen pressure in the chamber is kept below 10 kPa, by at least partially replacing the oxygen present in the chamber with another non-oxidizing gas which is introduced into the chamber.

12 Claims, No Drawings

(56) References Cited

OTHER PUBLICATIONS

Bailey, Diane. "Dehydrate Your Trail Food." Mar. 31, 2011. <https://www.backpacker.com/skills/dehydrate-your-trail-food/>. Accessed Dec. 4, 2018. (Year: 2001).*
Yaffe, Linda. "Be a Dried Food Gourmet Chef." Apr. 30, 2001. <https://www.backpacker.com/skills/be-a-dried-food-gourmet-chef/>. Accessed Dec. 4, 2018. (Year: 2001).*
Boyer et al. "Using Dehydration to Preserve Fruits, Vegetables, and Meats." Jun. 1, 2009. <https://pubs.ext.vt.edu/348/348-596/348-597.html>. Accessed Dec. 4, 2018. (Year: 2009).*
Decision to Grant counterpart Russian Application No. 2016107835/13(012417), dated Mar. 21, 2018, with English translation.
English translation of Chinese Office Action and Search Report dated Sep. 18, 2016, in a counterpart Chinese Application No. 2014800448020.
English translation of Chinese Office Action and Search Report dated Jul. 1, 2017, in a counterpart Chinese Application No. 2014800448020.
English translation of Japanese Office Action dated Apr. 26, 2016, in a counterpart Japanese Application No. 2016-520149.
English translation of Japanese Office Action dated Feb. 21, 2017, in a counterpart Japanese Application No. 2016-520149.
"The Operating Principle of the Catering Industry", p. 208, Jack D. Ninemeyer, Sep. 30, 1989.
"Canadian Food Labelling Requirements", p. 114, Standards and Regulations Center of AQSIQ Jun. 30, 2013.

\* cited by examiner

METHOD FOR PRESERVING FOOD

TECHNICAL FIELD

The present invention relates to a method for the hot preservation of food, having the features described in the preamble to claim 1, which is the principal claim. The food may be cooked or pre-cooked, but, in some cases, it may be both cooked and preserved as specified by the method.

TECHNOLOGICAL BACKGROUND

The invention relates to the specific field of preserving over a period of time foods and provisions which have been subjected to cooking or pre-cooking, and is applicable in particular, but not exclusively, to food preserving processes used in the provision of public catering, for example in restaurants, canteens and the like, supermarkets, public catering services and military catering.

At the present time, the preserving of cooked or pre-cooked food takes place in various ways, according to the required preservation time.

In a first preserving procedure, freezing is carried out if the required preservation time is reckoned in days or weeks.

In a second preserving procedure, the food is refrigerated (at 4° C., for example) if the preservation time is a few days.

In another procedure, the food is preserved in the hot state in equipment for maintaining the temperature (at 70° C., for example) if the required time is several hours.

In yet another procedure, preserving is carried out at ambient temperature if the cooked food is to be consumed immediately or within a few hours of cooking.

There are also known procedures for preserving food in a modified atmosphere, for example by keeping ready-to-use lightly processed products (such as grilled vegetables) for a few days in a refrigerator.

In the first two procedures of freezing and refrigeration, the use of the cold chain gives rise to numerous problems. A first limitation is due to the fact that the food has to be brought to a relatively high temperature before serving, and therefore considerable periods of time are required.

Furthermore, these procedures require a number of treatments, because the food has to be initially cooled and then brought back to the serving temperature, resulting in high costs.

In preservation using a cold chain, the organoleptic characteristics of the food are also frequently compromised to a greater or lesser extent, as a result of thermal and mechanical stresses (particularly during the freezing process) and because of bacterial action, which is reduced but not eliminated.

The cold chain also has a high specific energy requirement for the three essential steps of temperature reduction, preserving, and regeneration at the serving temperature.

In the last two procedures mentioned, in which preservation is carried out at ambient temperature and/or in a modified atmosphere, the preservation time is also limited to a few hours because, at these temperatures, bacterial action and the degradation of the organoleptic characteristics is very rapid.

In many cases it may be found that the ideal preservation time is several days, for example in catering, where the cycle is typically weekly.

DESCRIPTION OF THE INVENTION

The main object of the invention is to provide a method for the hot preserving of cooked or pre-cooked food, designed to prevent or retard microbial, physical and chemical changes in the cooked or pre-cooked food while keeping the organoleptic characteristics unaltered or improved over preservation times of about one week or more.

Another object is to devise a preserving method that enables the quality of the superficial characteristics of the food to be restored rapidly before it is served at the table, for example in order to crisp the surface again.

Yet another object is to reduce the time required for serving the food, from the preserving apparatus to the table, to a few minutes.

Yet another object is to provide a method for the hot preservation of food which requires a limited amount of specific energy for the whole process, from cooking to serving.

Yet another object is to cook the food at low temperature and to keep it in the same apparatus as that in which it was cooked.

It should be clarified that the term "hot" in the present context denotes temperatures above 57.2° C. (135° F.) as indicated in the US FDA Food Code, in order to prevent deterioration of the food due to bacterial action.

No technical literature can be found in the relevant prior art regarding research or studies of hot preservation of food for periods of about one week or more, or in any case for several days.

These and other objects, which are made apparent below, are achieved by the invention by means of a method for hot preservation of food, devised in accordance with the appended claims.

The features and advantages of the invention will be more apparent from the following detailed description of some preferred examples of embodiment of the invention, provided for guidance and in a non-limiting way.

PREFERRED EMBODIMENTS OF THE INVENTION

In the preserving method according to the invention, the food, having undergone a step of cooking or pre-cooking in a suitable cooking unit or directly in the apparatus used for hot preservation at the temperatures specified for this preservation, is subjected to a preservation step in which the cooked or pre-cooked food is confined in a preserving chamber.

It is therefore possible to use this preserving chamber solely for preserving the food which has been cooked or pre-cooked in other apparatus, or to use it for both the cooking and the preservation steps, in the case of certain foods.

The preserving chamber is a chamber with a controlled atmosphere, and the preserving method, according to a main combination of characteristics, provides for keeping the food in the chamber, at a selected predetermined temperature in the range from 57.2° C. to 90° C., for a preservation time of more than at least 24 hours, the partial oxygen pressure in this chamber being kept below 10 kPa.

Preferably, the preservation temperature is chosen to have a predetermined value in the range from 58° C. to 72° C. The choice of the value within the aforesaid range may also depend on the type of food to be preserved (for example, the type of meat, fish or vegetable). For example, vegetables are better preserved at a temperature a few degrees below that specified for the preservation of meat. At the aforesaid preservation temperatures, the bacterial action on the food is substantially negligible, and the degradation of the organoleptic characteristics is caused primarily by:

chemical reactions such as oxidation, and chemical transformation reactions other than oxidation, affecting compounds in the food under the action of the heat, and physical processes, for example the effect of the partial pressure of the water vapour (humidity) on the food, particularly on its surface.

The physical process which may have the greatest effect on the organoleptic characteristics of the food is the process brought about by the evaporation of water and its diffusion into the food, particularly on the surface. It may happen, for example, that the surface loses its original crispness during preservation, and a fast heat treatment at high temperature is required to restore it before serving. This heat treatment may also be provided in the method according to the invention, since it has no effect on the principal characteristics of the method.

Chemical transformation reactions other than oxidation affecting compounds in the food are very slow at the aforesaid preservation temperatures and therefore have a negligible effect. Indeed, in some cases, such as that of meat described as "lean", that is to say high in connective tissue, preservation for several days at these temperatures improves the quality, because the gelatinization of the collagen protein is promoted, thus increasing the tenderness of the meat.

Of all the chemical reactions occurring at the aforesaid preservation temperatures, therefore, oxidation is the primary cause of the degradation of the organoleptic characteristics.

The elimination or reduction of the oxygen concentration in the controlled atmosphere chamber in which the food is preserved is therefore essential if preservation times of several days are to be achieved.

The following techniques of oxidation reduction or elimination provided by the method according to the invention can be identified:
  replacement of the oxygen with another, non-oxidizing gas, for example nitrogen and/or water vapour and/or carbon dioxide and/or nitrogen oxide. Nitrogen has the advantage of being chemically neutral in relation to the cooked food, inexpensive and easily obtained; water vapour can be produced before or after the introduction of the nitrogen into the chamber in which the food is preserved. The non-oxidizing gas may be obtained, for example, from cylinders, or as the result of the combustion of air with hydrocarbons or other carbon compounds, generating a mixture of gases which typically contain nitrogen, carbon dioxide and water vapour. Additionally, humidification may be carried out before the non-oxidizing gas is introduced into the chamber, to prevent the drying of the food to be preserved.
  production of a higher or lower degree of vacuum, according to the oxygen concentration to be obtained;
  preservation of the food at water saturation pressure at the preservation temperature, by replacing the air with water vapour. For example, at 65° C. the saturation pressure is 0.25 bar. Clearly, this can be done for all food that does not undergo irreversible changes if left in an environment saturated with water vapour throughout the preservation time.

As regards the replacement of oxygen with another, non-oxidizing gas, in a preferred embodiment of the method of the invention the preserving chamber with a controlled atmosphere is kept at atmospheric pressure and at a predetermined temperature in the range from 57.2° C. to 90° C., preferably from 58° C. to 72° C., for a preservation time of more than at least 24 hours, the partial oxygen pressure in the chamber being kept below 10 kPa, by at least partially replacing the oxygen present in the chamber with nitrogen which is introduced into the chamber. The nitrogen may, for example, be introduced into the preserving chamber by being supplied from a cylinder.

If we assume, in a first approximation and for the sake of simplicity, that the air present in the chamber is composed solely of oxygen and nitrogen in their usual percentages by weight, namely 21% and 79% respectively, and that the atmospheric pressure is, in a first approximation, equal to about 100 kPa, the partial pressures of these gases, assuming that they behave substantially as ideal gases, may be considered to be 21 kPa (oxygen) and 79 kPa (nitrogen) respectively. Based on these conditions, according to the method of the invention the oxygen is partially replaced with nitrogen by introducing the latter into the preserving chamber until the respective concentrations of the oxygen and nitrogen tend towards 10% oxygen and 90% nitrogen, thereby creating respective partial pressures of 10 kPa for the oxygen and 90 kPa for the nitrogen. The replacement process, which, as mentioned above, takes place substantially at atmospheric pressure, may continue until the desired value of partial oxygen pressure (less than 10 kPa) is reached.

To improve the efficiency of the techniques described above, the following operations may also be provided:
  adding antioxidants to the food,
  introducing into the chamber in which the food is preserved a substance that reacts with oxygen to reduce its concentration, by either a chemical process (reaction) or a physical process (e.g. absorption or adsorption).

There is no one concentration of oxygen that is best in absolute terms, because it depends on:
  the desired preservation time,
  the preservation temperature,
  the relative humidity, and
  the degree of conservation of organoleptic characteristics that is considered acceptable.

In order to achieve a preservation time of about one week for dishes based on meat, fish and vegetables, without any substantial degradation of the organoleptic characteristics of the preserved cooked food, according to the method of the invention the following are conveniently provided:
  an oxygen concentration in the range from several ppm (parts per million by volume), equivalent to a partial pressure of several tens of Pa (Pascals), to several tens of ppm, equivalent to several hundreds of Pa (or even more in some cases, that is to say several thousand Pa or above); clearly, the lower the oxygen concentration, the better is the resulting preservation, with a few exceptions (for example certain vegetables such as beans),
  a temperature in the range from 57.2° C. to 90° C., preferably 58° C. to 72° C.,
  a very high relative humidity, close to saturation; in particular, with closed preservation environments and after psychrometric equilibrium has been reached, the vapour pressure of the water in the food equals the partial pressure of the vapour in the preserving chamber, thus preventing the evaporation of water from the surface of the food. If necessary, in order to avoid negative effects on the organoleptic characteristics, liquid water and/or water vapour may be added at the start of the preservation time, for example simultaneously with the introduction of non-oxidizing gas, so that the conditions of psychrometric equilibrium are reached rapidly and the evaporation of water from the surface of the food is prevented.

When the optimal oxygen concentration has been defined, it is important that it should not be exceeded over time, or, in any case, that it is kept within a predetermined range; otherwise the velocity of the oxidation process will increase, thereby advancing the degradation of the organoleptic characteristics.

Finally, it has been found experimentally that, during the preservation time (which lasts for a number of days), oxygen is released from the food at such a rate that it increases the concentration in the preserving environment (which is a closed environment having a volume adapted to that of the food to be preserved). This increase is frequently non-negligible, and requires a restoration of the initial concentration conditions. Therefore the preserving apparatus should preferably be provided with a system for restoring the initial oxygen concentration.

This system for restoring the initial oxygen concentration may be, for example:

- automatic, that is to say based on a device for measuring the concentration of oxygen and a system which restores its concentration as a function of this measurement, or
- based on a calculation which allows for the type of food, its quantity, the volume of the preserving apparatus and the rate of release of the oxygen.

As mentioned above, the method of the invention may also be applied to the cooking and preservation of food; that is to say, the food is cooked in the preserving chamber itself. This relates, in particular, to foods that are cooked at relatively low temperatures (for example, many varieties of fish and certain types of vegetables). When it has been cooked in the preserving apparatus, the food can be kept there for several more days, by following the procedures described for cooked or pre-cooked food (with control of the oxygen concentration and the temperature, and of the humidity if necessary).

In this case, the cooking may take place at the predetermined preservation temperature or at another temperature, in the presence of oxidizing gases or otherwise, and with or without the introduction and/or production of water vapour. In order to reduce cooking time, the cooking temperature may be suitably set at a higher level than the preservation temperature established subsequently in the preserving chamber.

Thus the invention achieves the proposed objects while yielding the stated advantages by comparison with the known solutions.

A principal advantage of the hot preserving method according to the invention is that cooked or pre-cooked food can be preserved for preservation times of more than 24 hours, and conveniently for several days, while the organoleptic characteristics of the food are maintained and the microbial, physical and chemical changes in the cooked or pre-cooked food are prevented or retarded, with the advantage that the quality of the surface characteristics of the food can be restored rapidly before serving, thus reducing to a few minutes the time required to serve the food from the preserving apparatus to the table, and with the further advantage of limiting the specific energy required for the preservation process.

The invention claimed is:

1. A method for preserving organoleptic characteristics associated with a cooked food, comprising the steps of:
    placing the cooked food having organoleptic characteristics of: taste, odor, appearance and texture in an atmospheric preservation chamber;
    establishing and maintaining a temperature in the atmospheric preservation chamber in a range between 58° C. to 72° C.;
    introducing a non-oxidizing gas into the atmospheric preserving chamber;
    establishing and maintaining an oxygen pressure in the atmospheric preserving chamber below 10 kPa; and,
    maintaining the temperature, pressure, and organoleptic characteristics of: taste, odor, appearance and texture until the cooked food product is removed from the preserving chamber no sooner than 24 hours from the time the cooked food is placed in the atmospheric preserving chamber.

2. A non-refrigerated method for preserving organoleptic characteristics associated with a cooked food, comprising the steps of:
    sealing the cooked food in an atmospheric preserving chamber;
    establishing and maintaining the atmospheric preserving chamber at a temperature between 58° C. and 72° C.;
    introducing a non-oxidizing gas into the atmospheric preserving chamber;
    establishing and maintaining an oxygen pressure in the atmospheric preserving chamber below 10 kPa; and
    maintaining the temperature and pressure until the cooked food is removed from the preserving chamber no sooner than 24 hours from the time the cooked food is placed in the atmospheric preserving chamber and preserving organoleptic characteristics of: taste, odor, appearance and texture associated with the cooked food.

3. The method of claim 2, further comprising: maintaining a water vapor pressure in the preserving chamber that equals a partial pressure of the vapor in the preserving chamber and prevents evaporation of water from the cooked food.

4. A method for preserving organoleptic characteristics associated with a cooked food, the method comprising:
    a) providing a preserving chamber;
    b) placing the cooked food having organoleptic characteristics in the preserving chamber;
    c) establishing an oxygen pressure of less than 10 kPa in the preserving chamber;
    d) maintaining the preserving chamber in a controlled environment at atmospheric pressure and a temperature in a range of 58° C. to 72° C.; and,
    e) maintaining the above conditions for at least 24 hours; whereby organoleptic characteristics of: taste, odor, appearance and texture, associated with the cooked food are preserved for the at least 24 hours.

5. The method according to claim 4, further comprising: introducing a non-oxidizing gas and replacing oxygen in the preserving chamber.

6. The method according to claim 4, further comprising: providing water vapor in the preservation chamber to replace oxygen.

7. The method according to claim 4, further comprising: adding an antioxidant to the cooked food.

8. The method according to claim 7, further comprising: providing water vapor in the preservation chamber to replace oxygen.

9. The method according to claim 8, further comprising: introducing a non-oxidizing gas and replacing oxygen in the preserving chamber.

10. The method according to claim 4, further comprising adding an antioxidant substances to the cooked food prior to placing the cooked food in the preserving chamber.

11. The method according to claim 4, wherein the oxygen pressure in the preservation chamber is maintained below 100 Pa.

12. The method according to claim 4, further comprising:
measuring the oxygen concentration in the preserving chamber during the preservation time, and restoring the oxygen concentration, according to the oxygen concentration measurement.

\* \* \* \* \*